Patented May 14, 1940

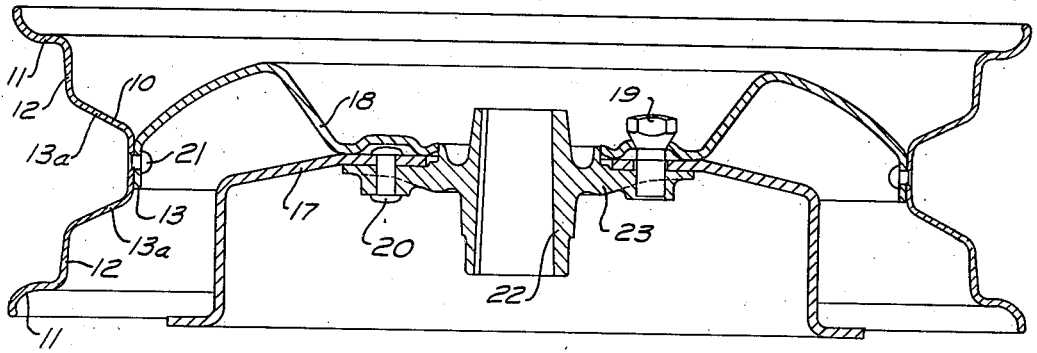
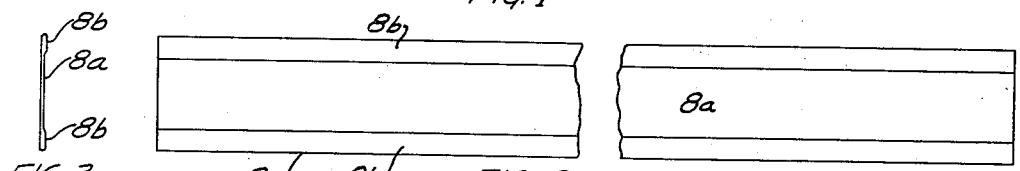
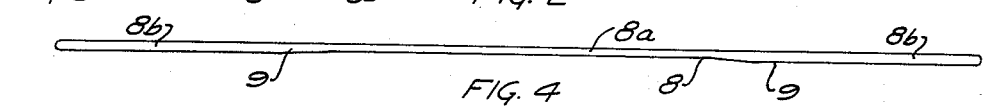
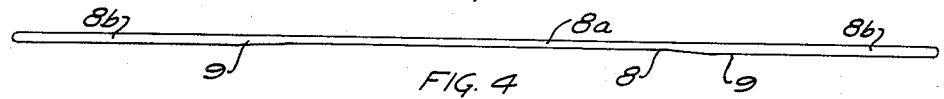
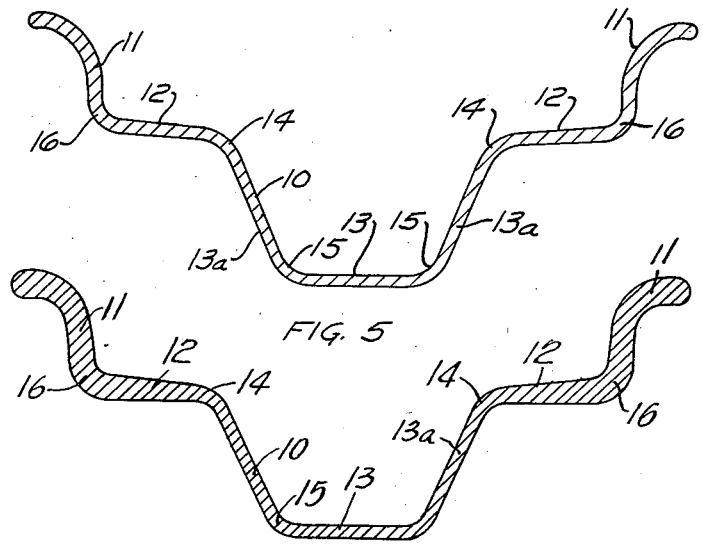
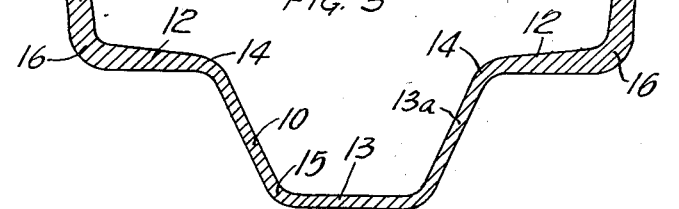

2,200,361

UNITED STATES PATENT OFFICE 2,200,361

VEHICLE WHEEL

J Harold Hunt, Lansing, Mich., assignor to Motor Wheel Corporation, Lansing, Mich., a corporation of Michigan Application October 20, 1937, Serial No. 169,929

2 Claims. (Cl. 301—97)

This invention relates to vehicle wheels, and more particularly to the rims for wheels that are provided with pneumatic tires.

Heretofore it has been the custom to manufacture rims for vehicle wheels from strips of metal which are of uniform thickness throughout. With rims manufactured from such strips there has been a tendency for failure to occur at the junction between the radially extending tire retaining flanges at the edges of the rims and the axially extending tire seat portions. This is due to the fact that during the various rolling processes incident to the manufacture of a rim, the metal is stretched more at the aforementioned junction than it is at other points, and the stresses set up by any forces tending to spread the walls of the rim apart are localized at the junction of the tire retaining side flanges and the tire seat portions.

The forces that tend to spread the side walls of the rim are caused by spreading of the side walls of the tire. As a wheel provided with pneumatic tires rotates on its axle there is a constant movement of the side walls of the rim alternately toward and away from each other. This is caused because the portion of the tire in contact with the ground is flattened and the side walls of the tire are consequently spread apart. The portion of the tire in contact with the ground is, of course, constantly changing, and as soon as any given section leaves the ground it resumes its normal shape, allowing the rim to return to its usual shape. The alternate back and forth bending of the metal in the rim caused by the flattening of the tire and its subsequent return to its normal cross-section soon causes fatigue to set in and failure to occur in the rim if the stresses are localized.

In order to prevent such failures, it has been the practice to make the rim of sheet metal of heavier gauge than would normally be necessary. As a result, more metal is used in the rim than would be necessary if the rim is properly designed to allow proper flexibility at all points on the rim.

This invention has for its object, therefore, to reduce the aforementioned tendency to fail in certain specified points by so forming the rim that the flexing will be substantially uniform throughout its cross-section, and no localization of stresses will occur.

Another object of the invention is to reduce the cost of manufacturing rims by reducing the amount of metal necessary to make a rim of the desired strength.

These and other objects ancillary thereto will appear more fully in the following specification when read in the light of the attached drawing, wherein like reference numerals designate corresponding parts in the several views.

In the drawing:

Figure 1 is a cross-sectional view of a vehicle wheel embodying the invention;

Figure 2 is a fragmentary plan view of a mill section strip from which the rim of the wheel is formed;

Figure 3 is a transverse cross-sectional view of the mill section strip shown in Figure 2;

Figure 4 is a view similar to Figure 3 on an enlarged scale;

Figure 5 is a transverse cross-sectional view of the completed rim shown in Figure 1; and Figure 6 is a diagrammatic cross-sectional view similar to Figure 5 but exaggerating the taper of parts of the rim.

Referring now more particularly to the drawing, there is shown in Figure 1 a wheel which comprises a rim 10 of the "drop center" type rigidly attached by means of rivets 21 to a wheel body 18. A hub 22 has a radially extending flange 23 to which the wheel body 18 is demountably secured by means of a plurality of cap screws 19. A brake drum 17 of conventional form is also rigidly attached to the flange 23 by means of a plurality of rivets 20. It will be noted that in general the structure of the wheel is of well known construction, the rim 10 being the only part that departs from conventional form.

The rim 10 is manufactured from a mill section strip 8, as shown in Figures 2 and 3. The term "mill section" is hereby used to identify a strip that is rolled to a definite cross-sectional configuration at the mill, as distinguished from what is ordinarily termed strip material, which is of uniform thickness throughout. The strip 8 is hot rolled at the mill and is so formed that the central portion is of a thickness somewhat less than that of the edges. It will be noted particularly from Figure 3 that there are relatively sharp lines of transition 9 between the thin central portion 8a and the thicker edge portion 8b of the strip.

The process of making the rim from the mill section 8 is substantially the same as that which would be used to form a rim from flat strip material. The strip 8 is coiled into a hoop form and the ends butt-welded together, and the hoop is then subjected to various rolling processes which give it the desired configuration shown in Figure 5. These rolling processes are well known in the art, and need not be described here.

The rim shown in Figure 5 comprises a gutter portion composed of a flat base 13 and side walls 13a which are joined by the rounded corners 15. From the outer edges of the side walls 13a extend tire seat portions 12 which merge into radial tire retaining flanges 11 through the rounded corners 16.

The base 13 and the side walls 13a of the gutter are of substantially uniform thickness. The tire retaining flanges 11 are thicker than the side walls 13a and base 13, and the tire seat portions taper uniformly from the outer edges of the side walls 13a at the shoulder 14 to the corner 16.

The mill section strip 8 is so formed that the lines of transition 9 are located so that they will be placed in the finished rim at the shoulder 14. Then when the mill section strip is rolled into the shape shown in Figure 5 the metal outwardly of the shoulders 14 is drawn so that a smooth, continuous taper will be formed in the tire seat portions 12 and the tire retaining flanges 11. In other words, the metal increases progressively in thickness outwardly from the shoulders 14 to the outer edges of flanges 11. The taper of the tire seat portions 12 and the tire retaining flanges 11 is clearly indicated in exaggerated form in Figure 6.

It is extremely important that the change in thickness between the central portion 8a and the side portions 8b of the strip 8 be located at the shoulders 14 of the finished rim. If the lines of transition 9 are not located at the shoulders 14, but are placed somewhere in the side walls 13a of the gutter, they will not disappear during the rolling of the rim to shape. Therefore, there will be an abrupt change from the thin to the thick metal in the side walls 13a, and though flexure will occur throughout the thin portion of the metal, there will be little or no flexing of the thicker part. Consequently, there will be undesirable bending at the lines of transition and failure will occur.

If, on the other hand, the lines of transition in thickness are placed in the tire seat portions 12, it will be impossible to prevent an abrupt change in thickness, and there will be localization of stress along the line of such change. As a result, continued flexing will cause failure.

By placing the lines of transition at the shoulders, however, when the hoop is rolled into the final form, the metal is drawn out to a certain extent and the thin side walls 13a merge into the tire seat portions 12 by continuous taper that begins in the shoulders 14. The stresses are not confined to a very narrow area but are spread over substantially the entire width of the rim and failure will not occur.

In the construction herein disclosed the thickness of the metal in the gutter portion of the rim may be considerably less than that ordinarily required, and a substantial saving in metal will thereby be attained.

The scope of the invention is indicated in the appended claims.

I claim:

1. A rim for a vehicle wheel comprising a continuous annular metal ring, the cross-section of the rim being uniform throughout its circumferential extent and consisting of a central channel shaped portion, tire seat portions extending axially outwardly from the walls of the channel shaped portion, and flanges extending substantially radially outwardly from the axially outer edges of the tire seat portions, the walls and base of the channel shaped portion being of uniform thickness, and the tire seat portions and flanges increasing in thickness substantially uniformly from the junctions of the tire seat portions with the side walls of the channel shaped portion to the outer edges of the flanges, said channel shaped portion, tire seat portions, and flanges being of a single thickness of metal.

2. A rim for a vehicle wheel comprising a continuous annular metal ring of single thickness having a uniform cross-section throughout its circumferential extent, comprising a central channel shaped portion, tire seat portions extending axially outwardly from the walls of the channel shaped portion, and flanges extending substantially radially outwardly from the outer edges of the tire seat portions, the walls and base of the channel shaped portion being of a uniform thickness less than the thickness of the tire seat portions and flanges, the tire seat portions increasing in thickness substantially uniformly in a direction outwardly from the junction thereof with the side walls of the channel shaped portion.

J HAROLD HUNT.